(12) United States Patent
Holmes

(10) Patent No.: US 6,834,626 B1
(45) Date of Patent: Dec. 28, 2004

(54) HYBRID ELECTRIC POWERTRAIN

(75) Inventor: Alan G. Holmes, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/819,418

(22) Filed: Apr. 7, 2004

(51) Int. Cl.$^7$ .................................................. F02B 75/18
(52) U.S. Cl. ........................................ 123/52.5; 123/294
(58) Field of Search ............................... 123/52.5, 53.4, 123/55.6, 58.3, 299, 294; 180/337

(56) References Cited

U.S. PATENT DOCUMENTS 5,134,984 A * 8/1992 Nonaka et al. ............. 123/494
6,527,658 B2   3/2003 Holmes et al. ................. 475/5

* cited by examiner

Primary Examiner—Bibhu Mohanty
(74) Attorney, Agent, or Firm—Leslie C. Hodges

(57) ABSTRACT

A hybrid electric powertrain includes a direct-injection, two-stroke, port scavenged engine in hybrid combination with an electric motor. The engine is configured to use a fuel with wide flammability limits, such as hydrogen, for extremely lean combustion to significantly reduce emissions. The two-stroke engine eliminates the engine displacement problems associated with extremely lean combustion, and the use of a hybrid powertrain allows the engine to be operated efficiently with reduced throttling compared to the prior art. A continuously variable transmission, or a transmission with closely-stepped ratios, is preferably employed.

10 Claims, 2 Drawing Sheets

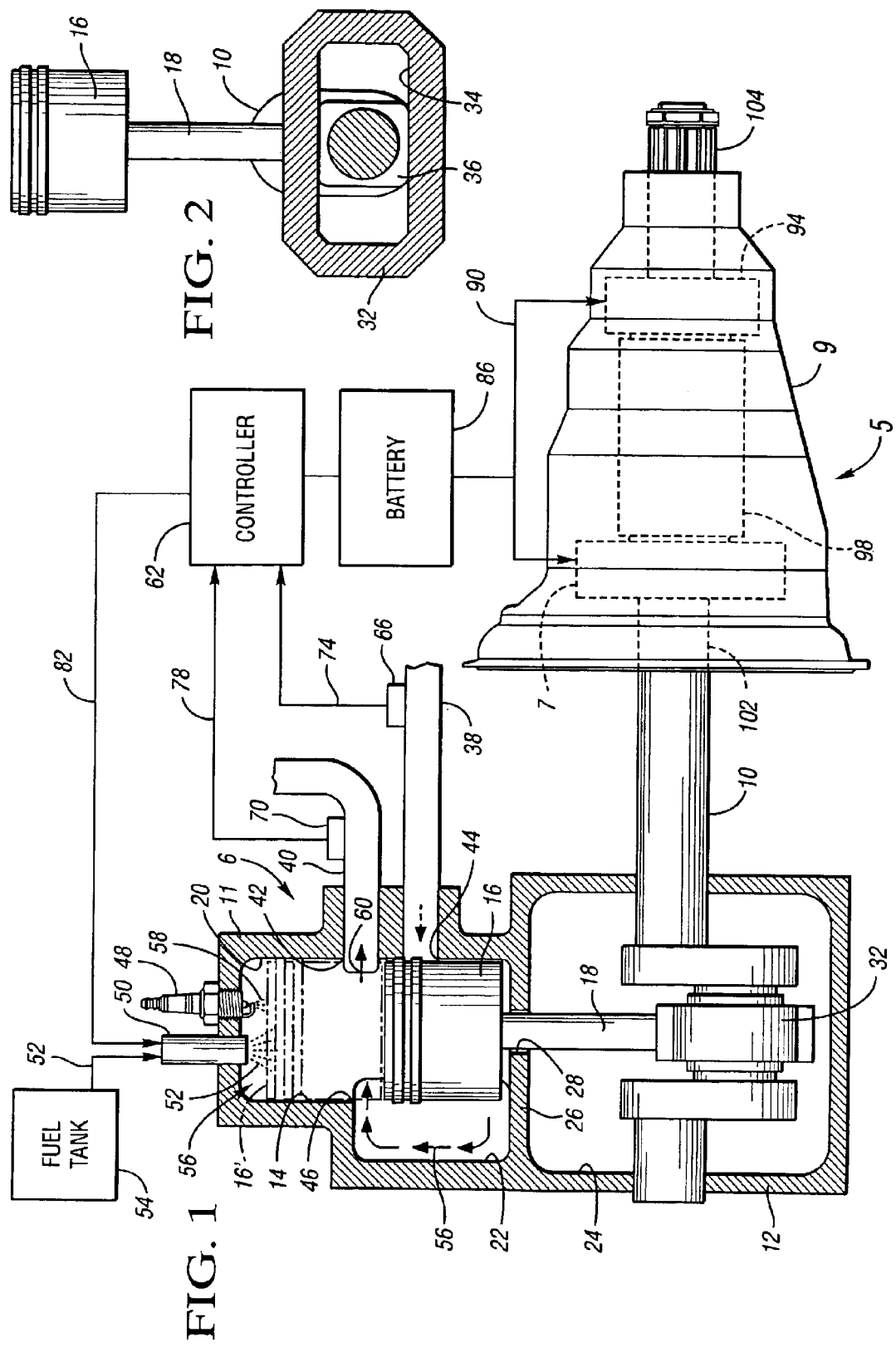

| STEPPED RATIO TRANSMISSION | | STEPS | |
|---|---|---|---|
| | RATIOS | | |
| 1 | 5.52 | 1/2 | 1.40 |
| 2 | 3.95 | 2/3 | 1.40 |
| 3 | 2.82 | 3/4 | 1.33 |
| 4 | 2.12 | 4/5 | 1.33 |
| 5 | 1.60 | 5/6 | 1.33 |
| 6 | 1.20 | 6/7 | 1.20 |
| 7 | 1.00 | Average | 1.33 |

HYBRID ELECTRIC POWERTRAIN

TECHNICAL FIELD

This invention relates to vehicle powertrains having a two-stroke engine configured for combustion with at least 66% excess air and an electric motor in hybrid combination with the two-stroke engine.

BACKGROUND OF THE INVENTION

Hydrogen is a fuel that can burn reliably in a piston engine with a large amount of excess air. Burning hydrogen, or another fuel with wide flammability limits, with sufficient excess air produces only very small amounts of unburned fuel and very small amounts of oxides of nitrogen as emissions. Slightly lean combustion tends to be ideal for eliminating unburned fuel, and combustion in the presence of 66% or more excess air tends to eliminate oxides of nitrogen when hydrogen is the fuel.

However, prior art vehicle engines and powertrains cannot make very effective and efficient use of hydrogen fuel to take full advantage of extremely lean combustion. A hydrogen-fueled engine must process about twice as much air to effectively eliminate regulated emissions; excess air requires engine displacement be proportionately larger for the same amount of fuel burned and the power produced. Thus, for example, an engine operating with 100% excess air would require twice as much displacement as an engine operating with no excess air to achieve the same power output for the same amount of fuel. Increased size tends to make the engine less efficient, since its friction is relatively greater compared to the power produced. Since hydrogen is relatively expensive and difficult to store, it must be used efficiently.

Two-stroke engines with port scavenging are very simple. They lack separate intake and exhaust strokes and therefore do not keep intake and exhaust gases as well separated as four-stroke engines. The mixing of fresh and burned gases in the scavenging process normally makes the control and reduction treatment of emissions from the two-stroke engine relatively difficult. Without direct injection, escaping intake charge carries fuel to the exhaust, and the exhaust is always lean and cannot be cleaned by conventional catalytic converters. Burned gases remaining in the cylinder also reduce the maximum power that can be produced. As the engine is throttled to low torque and power, more burned gases remain, which can cause poor combustion and additional emissions.

SUMMARY OF THE INVENTION

A vehicle powertrain is provided that effectively and efficiently uses hydrogen to take advantage of lean combustion. The powertrain of the invention includes a torque-producing two-stroke engine in hybrid combination with an electric motor and a vehicle transmission. The two-stroke engine includes a cylinder, a piston in the cylinder reciprocally translatable between a top dead center position and a bottom dead center position for a compression stroke and a power stroke, an inlet port for admitting air into the cylinder, and a fuel injector configured to directly inject fuel into the cylinder for combustion. The engine is configured such that the fuel injector injects a quantity of fuel into the cylinder that results in at least 66% excess air in the cylinder during the combustion.

A direct injection port scavenged two-stroke engine configured for very lean combustion tends to eliminate the problems found in prior art lean-burn powertrains and prior art two-stroke engines. Residual gases that cannot be removed by the two-stroke engine are both a contributor to and substitute for excess air that a four-stroke engine must purposefully include to run very lean. A port scavenged two-stroke cylinder might typically contain one-third burned gases ("retained gases") and two-thirds fresh gases in the midst of the compression stroke. In an engine operating with a large amount of excess air, almost half of the retained gases would actually be air, and all would be useful for limiting oxides of nitrogen. The two-stroke engine would then have an almost two-to-one advantage in power produced per unit of engine displacement over a four-stroke engine, and a port scavenged engine has no conventional valves, so its cost, size, and friction are much better.

The invention also improves upon the prior art by eliminating problems associated with throttling a two-stroke engine. The electric motor provides a substantial amount of peak power for vehicle acceleration, so the two-stroke engine can be configured to operate within a reduced range of power output. The transmission is preferably a continuously variable transmission (CVT) or a closely-stepped ratio transmission. The electric motor may provide some or most of the power for quick response to accelerator pedal "tip-in," and the CVT or closely-stepped-ratio transmission can be overshifted so the engine can be run with little or no throttle margin for acceleration.

The hybrid powertrain also alleviates the effect of lean combustion and excess air on engine size; the motor contributes to power output and thus the engine size may be smaller in hybrid combination with the motor than without a motor. The low cost, mass, and size of the two-stroke engine tends to offset the cost, mass and size of hybrid and CVT or close ratio transmission components. The smoother operation of the two-stroke engine also helps to improve comfort in relatively high torque, low speed overshifted operation compared to the prior art.

The above features and advantages, and other features and advantages, of the present invention are readily apparent from the following detailed description of the best modes for carrying out the invention when taken in connection with the accompanying drawing.

BRIEF DESCRIPTION OF THE DRAWING

FIG. 1 is a schematic side view of a vehicle powertrain having a two-stroke engine configured for extremely lean combustion, an electric motor, and a transmission;

FIG. 2 is a schematic front view of the piston, connecting rod, and scotch yoke of the engine of FIG. 1;

DESCRIPTION OF THE PREFERRED EMBODIMENTS

Figure 4:
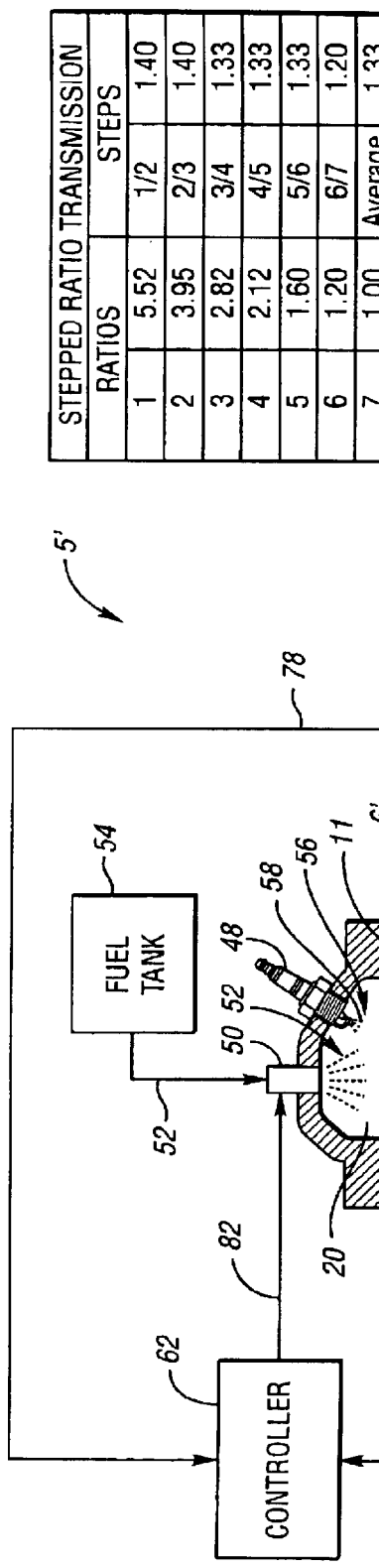
FIG. 4 is a truth table depicting step ratios for the transmission of the powertrain of FIG. 3.

Referring to FIG. 1, a hybrid vehicle powertrain 5 is schematically depicted. The powertrain 5 includes two-stroke engine 6, an electric motor 7, and a transmission 9. The two-stroke engine 6 includes a crankshaft 10 operatively connected to the transmission 9 and the electric motor 7 so that the engine and the motor are in parallel hybrid combination.

The engine 6 includes a block 11 and a crankcase 12. The block 11 defines a cylinder 14 in which a piston 16 resides.

The piston 16 is mounted to connecting rod 18 and crankshaft 10 for reciprocating motion in the cylinder 14 between bottom dead center (shown in solid line at 16) and top dead center (shown in phantom line at 16'). The block 11 and the piston 16 cooperate to form a combustion chamber 20 on one side of the piston 16, and an air intake pressure chamber 22 on the other side of the piston. The air intake pressure chamber 22 is separated from crankcase chamber 24 by wall 26. The connecting rod 18 extends into the crankcase chamber 24 through a hole 28 in the wall 26. The connecting rod 18 and hole 28 are sufficiently configured and shaped so that there is substantially no fluid communication between the crankcase chamber 24 and the air intake pressure chamber 22.

The connecting rod 18 is rigidly connected to a scotch yoke 32. Referring to FIG. 2, wherein like reference numbers refer to like components from FIG. 1, the scotch yoke 32 defines an elongated slot 34. Member 36 is rotably connected to the crankshaft 10 and is slidingly contained within the slot 34 for translation therein. The scotch yoke 32 operatively interconnects the piston 16 and the crankshaft 10 in a manner that results in linear motion of the connecting rod 18 during reciprocation of the piston 16 in the cylinder 14.

Referring again to FIG. 1, operably connected to the block 11 is intake manifold 38 and exhaust manifold 40. The combustion chamber 20 communicates with the exhaust manifold 40 through exhaust port 42 in the block 11. Intake manifold 38 communicates with the pressure chamber 22 through port 44. An intake port 46, also referred to as "inlet port, provides fluid communication between the combustion chamber 20 and the air intake pressure chamber 22. Cylinder 14 is provided with a spark plug 48 and a fuel injector 50. The fuel injector is configured and positioned to directly inject fuel 52 from fuel tank 54 into the combustion chamber 20. The fuel 52 is preferably hydrogen or another fuel with wide flammability limits, such as dimethyl ether.

During an upstroke, piston 16 moves from bottom dead center in cylinder 14 toward top dead center. During the upward movement of the piston 16, air intake port 46 and exhaust port 42 are closed off from the combustion chamber 20, with air being inducted into pressure chamber 22 by the partial vacuum created by the piston 16. Air 56 in combustion chamber 20 is mixed with fuel 52 from injector 50 and compressed until the spark plug 48 ignites the compressed mixture near the top of the stroke. As combustion 58 is initiated, the piston 16 begins its downstroke, decreasing the volume of pressure chamber 22 and the inducted air within. The air within the pressure chamber 22 is prevented from escaping through the intake manifold 38 by closure of a reed valve mechanism (not shown). Toward the end of the downstroke, piston 16 uncovers exhaust port 42 to release the combusted fuel and air (exhaust gas 60), followed by an uncovering of the intake port 46, enabling the air 56 compressed within the pressure chamber 22 to flow through the intake port 46 into the combustion chamber 20. The cycle begins anew when piston 16 reaches the bottom of its travel in cylinder 14.

Electronic control module (ECM), or controller, 62 is typically a conventional digital computer used by those skilled in the art of engine control, and includes the standard elements of a central processing unit, random access memory, read only memory, analog-to-digital converter, input/output circuitry, and clock circuitry. The controller 62 is suited to receive information on various engine parameters from sensors connected to the engine. Upon receipt of such information, the controller 62 performs required computations and provides output signals which are transmitted to various operating systems which affect the operation of the engine 6.

More specifically, the sensors include a mass air flow meter 66 connected to the intake manifold 38, and a proportional oxygen sensor 70 connected to the exhaust manifold 40. The mass air flow meter 66 is configured to measure, and transmit a signal 74 indicative of, the air flow rate through the intake manifold 38. The oxygen sensor 70 is configured to measure, and transmit a signal 78 indicative of, the amount of oxygen in the exhaust manifold 40.

The controller 62 is configured receive and process signals 74, 78, and transmit control signals 82 to which the fuel injector 50 is responsive thereby to control the amount of fuel 52 injected by the fuel injector 50 and maintain a predetermined air/fuel ratio. The controller 62 is configured to operate the engine 6 such that at least 66% excess air is present in the combustion chamber 20 for combustion with the hydrogen fuel 52, i.e., Lambda equals 1.66.

In the context of the present invention, the percentage of excess air is the percentage of air that is in excess of the amount required for stoichiometric combustion of fuel. Thus, if the cylinder contains no more air than the amount necessary for stoichiometric combustion of the fuel in the cylinder, then the cylinder contains zero percent excess air. If the cylinder contains twice the amount of air necessary for stoichiometric combustion of the fuel in the cylinder, then the cylinder contains 100% excess air. Preferably, the controller causes the engine to run with at least 100% excess air, i.e., a Lambda value of 2 or greater. Lambda is equal to the air/fuel ratio divided by the stoichiometric air/fuel ratio. In the context of the present invention, air" in the cylinder during combustion includes fresh air admitted by an inlet port, as well as exhaust gases that were not exhausted through the exhaust port after a preceding combustion event (residual gases).

Electric motor 7 is operably connected to an energy storage device such as battery 86 that selectively transmits energy 90 to the motor 7 so that the motor contributes to power output of the transmission 9. The transmission 9 is a continuously variable transmission. More specifically, the transmission 9 depicted in FIG. 1 is an electronically variable transmission (EVT). Accordingly, transmission 9 includes a second electric motor 94, an input shaft 102 that is connected to the crankshaft 10, an output shaft 104, and differential gearing 98 operatively connected to the motors 7, 94, the input shaft 102 and the output shaft 104. The controller 62 is operatively connected to the battery 86 and motors 7, 94 to control the speed of the motors and thereby vary the speed ratio between the input shaft 102 and the output shaft 104. An exemplary EVT is described in U.S. Pat. No. 6,527,658, issued Mar. 4, 2003 to Holmes et al, which is hereby incorporated by reference in its entirety.

Figure 3:
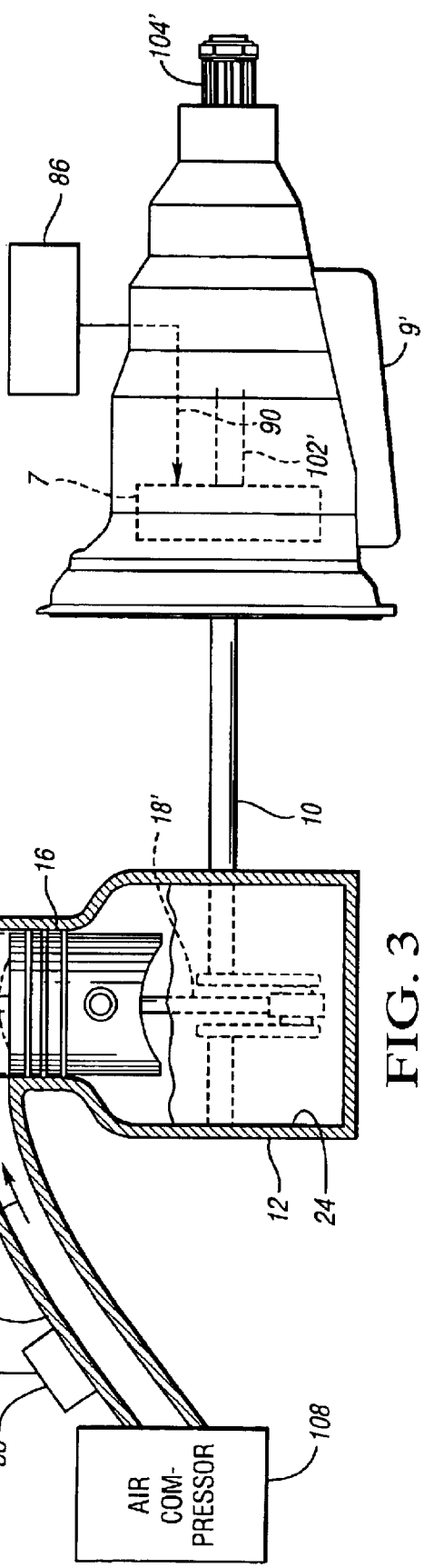
FIG. 3 is a schematic side view of an alternative vehicle powertrain configuration.

Referring to FIG. 3, wherein like reference numbers refer to like components from FIGS. 1 and 2, an alternative embodiment is schematically depicted. Engine 6' does not include a pressure chamber on one side of piston 16. Rather, an air compressor 108 in intake manifold 38' provides sufficient pressure to air entering cylinder 14 for scavenging.

Transmission 9' is configured to provide a plurality of discrete, successive speed ratios between input shaft 102' and output shaft 104'. Those skilled in the art will recognize and understand various transmission configurations that result in a plurality of discrete, successive speed ratios. Referring to FIG. 4, a table depicts the ratio steps of the transmission 9'. The transmission has seven forward speed ratios; the average of all forward ratio steps is equal to or less than 1.34:1. In the embodiment depicted, the average of all the ratio steps is 1.33:1.

While the best modes for carrying out the invention have been described in detail, those familiar with the art to which this invention relates will recognize various alternative designs and embodiments for practicing the invention within the scope of the appended claims.

What is claimed is:

1. A vehicle powertrain comprising:
  a torque-producing two-stroke engine having
    a cylinder,
    an air intake port for admitting air into the cylinder,
    an exhaust port for releasing exhaust gases from the cylinder,
    a piston being reciprocally translatable within the cylinder between a top dead center position and a bottom dead center position for a compression stroke and a power stroke, wherein the intake port and the exhaust port are sufficiently positioned such that the piston obstructs said ports at the top dead center position, and the piston does not obstruct said ports at the bottom dead center position to enable port scavenging,
    a fuel injector configured to directly inject fuel into the cylinder for combustion with the air, and
    a controller operatively connected to the fuel injector and configured to cause the fuel injector to inject a quantity of fuel into the cylinder that results in at least 66% excess air in the cylinder during said combustion;
  an electric motor and an electric storage battery in hybrid combination with said two-stroke engine; and
  a transmission operatively connected to the engine and the electric motor.

2. The vehicle powertrain of claim 1, wherein said fuel is hydrogen.

3. The vehicle powertrain of claim 1, wherein the engine further includes a crankcase defining a crankcase chamber, and wherein the air intake port is not in fluid communication with the crankcase chamber.

4. The vehicle powertrain of claim 3, wherein the engine further comprises an air compressor in fluid communication with said intake port to pressurize said air.

5. The vehicle powertrain of claim 3, wherein the engine at least partially defines a combustion chamber on one side of the piston and at least partially defines an air intake pressure chamber on another side of the piston; wherein the air intake pressure chamber is in fluid communication with the air intake port and is not in fluid communication with the crankcase chamber.

6. The vehicle powertrain of claim 3, wherein said fuel is hydrogen.

7. The vehicle powertrain of claim 1, wherein the transmission is characterized by a continuously variable speed ratio.

8. The vehicle powertrain of claim 1, wherein the transmission is characterized by a plurality of successive, stepped speed ratios; and wherein the transmission is configured such that the average of all ratio steps is 1.34:1 or less.

9. A vehicle powertrain comprising:
  a torque-producing two-stroke engine having
    a cylinder,
    an air intake port for admitting air into the cylinder,
    an exhaust port for releasing exhaust gases from the cylinder,
    a piston in the cylinder reciprocally translatable between a top dead center position and a bottom dead center position for a compression stroke and a power stroke, wherein the intake port and the exhaust port are sufficiently positioned such that the piston obstructs the ports in the top dead center position, and the piston does not obstruct the ports in the bottom dead center position, to enable port scavenging,
    a fuel injector configured to directly inject fuel into the cylinder for combustion with the air, and
    at least one controller operatively connected to the fuel injector and configured to cause the fuel injector to inject a quantity of fuel into the cylinder that results in at least 66% excess air in the cylinder during said combustion; and
  a transmission including an input shaft, an output shaft, two electric motors, and differential gearing operatively connected to the input shaft, the output shaft, and the two electric motors, and wherein said at least one controller is operatively connected to the two electric motors to control the speed of the motors and thereby control the speed ratio between the input shaft and the output shaft.

10. The vehicle powertrain of claim 9, wherein said fuel is hydrogen.

* * * * *